United States Patent
Kotaru et al.

(10) Patent No.: US 12,501,467 B2
(45) Date of Patent: Dec. 16, 2025

(54) MACHINE LEARNING BASED INTERFERENCE DETECTION FOR TIERED LICENSING DEPLOYMENTS

(71) Applicant: Microsoft Technology Licensing, LLC, Redmond, WA (US)

(72) Inventors: Manikanta Kotaru, Kenmore, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 732 days.

(21) Appl. No.: 17/841,341

(22) Filed: Jun. 15, 2022

(65) Prior Publication Data

US 2023/0413308 A1    Dec. 21, 2023

(51) Int. Cl.
H04W 72/541      (2023.01)
H04B 17/345      (2015.01)
H04W 16/14       (2009.01)
H04W 72/0453     (2023.01)

(52) U.S. Cl.
CPC ........ H04W 72/541 (2023.01); H04B 17/345 (2015.01); H04W 16/14 (2013.01); H04W 72/0453 (2013.01)

(58) Field of Classification Search
CPC ............................ H04B 17/345; H04W 16/14; H04W 72/0453; H04W 72/541
See application file for complete search history.

(56) References Cited

U.S. PATENT DOCUMENTS

| | | |
|---|---|---|
| 2017/0318470 A1 | 11/2017 | Srikanteswara et al. |
| 2019/0037537 A1 | 1/2019 | Hassan et al. |
| 2021/0334705 A1* | 10/2021 | Akbar .................... G06N 20/20 |
| 2023/0109658 A1* | 4/2023 | Syllaios .................. G06F 18/23 |
| | | 455/552.1 |
| 2025/0046327 A1* | 2/2025 | Sawada ............... G10L 21/0308 |

OTHER PUBLICATIONS

"International Search Report and Written Opinion Issued in PCT Application No. PCT/US23/021614", Mailed Date: Aug. 29, 2023, 12 Pages.

Wang, et al., "When Machine Learning Meets Spectrum Sharing Security: Methodologies and Challenges", In Journal of IEEE Open Journal of the Communications Society, vol. 3, Jan. 26, 2022, pp. 176-208.

Youssef, et al., "Concept Design of Medium Access Control for Spectrum Access Systems in 3.5 GHz", In Proceedings of International Conference on Wireless Communications, Signal Processing and Networking, Mar. 22, 2018, 8 Pages.

* cited by examiner

Primary Examiner — Brian P Cox
(74) Attorney, Agent, or Firm — ArentFox Schiff LLP (57) ABSTRACT

Described are examples for machine learning based interference detection for tiered licensing deployments. A network entity in a general authorized access (GAA) deployment checks a local spectrum access database of GAA users to determine that a portion of shared use spectrum is free from known local users in a geographic area. The network entity receives samples of a wireless signal including at least a desired signal on the portion of shared use spectrum. The network entity determines whether the wireless signal includes multiple independent signals. The network entity identifies an interfering signal in response to determining that the wireless signal includes multiple independent signals.

20 Claims, 5 Drawing Sheets

MACHINE LEARNING BASED INTERFERENCE DETECTION FOR TIERED LICENSING DEPLOYMENTS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize one or more data centers with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various radio units (RU) can be deployed at edge servers with connections to antennas. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the data centers utilize generic computing resources, a virtualized RAN may provide scalability and fault tolerance for base station processing. For example, the data centers may assign a variable number of computing resources (e.g., servers) to perform processing for the radio units based on a workload. Further, a virtualized RAN may implement multiple layers of RAN processing at data centers, enabling collection of multiple data feeds.

A tiered licensing deployment refers to a system deployed in a shared access band with two or more tiers of licensees. For example, the citizens broadband radio service (CBRS) band has a three-tiered access and authorization framework for the 3550-3700 MHz (3.5 GHz) band. The three tiers include incumbent access, priority access, and general authorized access (GAA). A GAA user must not cause harmful interference to Incumbent Access users or Priority Access Licensees and must accept interference from these users. AA users also have no expectation of interference protection from other GAA users

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for wireless communications, including: a memory storing computer executable instructions; and a processor coupled with the memory and configured to execute the instructions to: check a local spectrum access database of known general authorized access (GAA) users to determine that a portion of shared use spectrum is free from known local users in a geographic area; receive samples of a wireless signal including at least a desired signal on the portion of shared use spectrum; determine whether the wireless signal includes multiple independent signals; and identify an interfering signal in response to determining that the wireless signal includes multiple independent signals.

In some aspects, the techniques described herein relate to an apparatus, wherein the processor is further configured to mitigate the interfering signal.

In some aspects, the techniques described herein relate to an apparatus, wherein to mitigate the interfering signal, the processor is further configured to shift a carrier frequency within the shared use spectrum.

In some aspects, the techniques described herein relate to an apparatus, wherein to mitigate the interfering signal, the processor is further configured to add the interfering signal to the local spectrum access database.

In some aspects, the techniques described herein relate to an apparatus, wherein the processor is further configured to determine a difference between an expected decoding rate based on a measured signal quality and an actual decoding rate, wherein determining whether the wireless signal includes multiple independent signals in response to the difference exceeding a threshold.

In some aspects, the techniques described herein relate to an apparatus, wherein to determine whether the wireless signal includes multiple independent signals, the processor is configured to apply the samples of the wireless signal to a machine-learning based source separation algorithm.

In some aspects, the techniques described herein relate to an apparatus, wherein to determine whether the wireless signal includes multiple independent signals, the machine-learning based source separation algorithm is configured to indicate multiple copies of the desired signal with different delays.

In some aspects, the techniques described herein relate to an apparatus, wherein to determine whether the wireless signal includes multiple independent signals, the machine-learning based source separation algorithm is configured to indicate at least one signal independent of the desired signal.

In some aspects, the techniques described herein relate to an apparatus, wherein the processor is configured to: check a spectrum access system SAS database of licensed users at access tiers higher than the GAA users; and select the portion of shared use spectrum to avoid interference to the licensed users.

In some aspects, the techniques described herein relate to a method including: checking a local spectrum access database of known general authorized access (GAA) users to determine that a portion of shared use spectrum is free from known local users in a geographic area; receiving samples of a wireless signal including at least a desired signal on the portion of shared use spectrum; determining whether the wireless signal includes multiple independent signals; and identifying an interfering signal in response to determining that the wireless signal includes multiple independent signals.

In some aspects, the techniques described herein relate to a method, further including mitigating the interfering signal.

In some aspects, the techniques described herein relate to a method, wherein mitigating the interfering signal includes shifting a carrier frequency within the shared use spectrum.

In some aspects, the techniques described herein relate to a method, wherein mitigating the interfering signal includes adding the interfering signal to the local spectrum access database.

In some aspects, the techniques described herein relate to a method, further including determining a difference between an expected decoding rate based on a measured signal quality and an actual decoding rate, wherein determining whether the wireless signal includes multiple independent signals is in response to the difference exceeding a threshold.

In some aspects, the techniques described herein relate to a method, wherein determining whether the wireless signal includes multiple independent signals includes applying the samples of the wireless signal to a machine-learning based source separation algorithm.

In some aspects, the techniques described herein relate to a method, wherein determining whether the wireless signal includes multiple independent signals includes an output of the machine-learning based source separation algorithm indicating multiple copies of the desired signal with different delays.

In some aspects, the techniques described herein relate to a method, wherein determining whether the wireless signal includes multiple independent signals includes an output of the machine-learning based source separation algorithm indicating at least one signal independent of the desired signal.

In some aspects, the techniques described herein relate to a method, further including: checking a spectrum access system (SAS) database of licensed users at access tiers higher than the GAA users; and selecting the portion of shared use spectrum to avoid interference to the licensed users.

In some aspects, the techniques described herein relate to a non-transitory computer-readable medium storing computer-executable instructions that when executed by a processor cause the processor to: check a local spectrum access database of known general authorized access (GAA) users to determine that a portion of shared use spectrum is free from known local users in a geographic area; receive samples of a wireless signal including at least a desired signal on the portion of shared use spectrum; determine whether the wireless signal includes multiple independent signals; and identify an interfering signal in response to determining that the wireless signal includes multiple independent signals.

In some aspects, the techniques described herein relate to a non-transitory computer-readable medium, further including instructions to mitigate the interfering signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to operation of a general authorized access (GAA) system within a tiered licensing system. For example, in the United States, the citizens band radio service (CBRS) spectrum is available on the 3.5 GHz band from 3550-3700 MHz. The top tier is incumbent access that includes federal users, fixed satellite service earth stations and some legacy wireless broadband licensees. Incumbent Access users receive protection against harmful interference from Priority Access Licensees and General Authorized Access users. The second tier is priority access licenses (PALs) that have licenses to 10 MHz channels within the CBRS spectrum. PALs must protect and accept interference from Incumbent Access users but receive protection from General Authorized Access users. The third tier is GAA. GAA users must not cause harmful interference to Incumbent Access users or Priority Access Licensees and must accept interference from these users. GAA users also have no expectation of interference protection from other GAA users.

To provide protection to Incumbent Access users and PAL users, a spectrum access system (SAS) provides information about usage by Incumbent Access users and PAL users. Accordingly, a GAA user may access the SAS to avoid causing interference to higher tier users and avoid interfering signals from the higher tier users. The SAS, however, does not provide any information about other GAA users. Because GAA users have no expectation of interference protection from other GAA users, a GAA system may experience interference from other GAA users. Accordingly, it may be desirable for an enterprise implementing a GAA system may attempt to identify and mitigate interfering signals from other GAA users. In conventional licensed systems, the licensee may be protected from external interferers, so interference detection techniques may not be necessary or may be limited to detection of interference among devices within the licensed system. In conventional unlicensed systems, the spectrum may be shared using techniques such as clear channel assessment (CCA) and listen before talk (LBT). For a GAA user, however, there may be no guarantee that an interferer will share the spectrum based on such techniques.

In a software radio access network (also referred to as a virtual RAN or vRAN), various base station components may be implemented in software executing on generic computing resources. For example, in a cloud network implementation, vRAN components may be executed as workloads on servers or datacenters. A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

In an aspect, the present disclosure provides a system for identifying and mitigating interfering signals from other GAA users. The system may maintain and/or access a local spectrum access database of known GAA users to determine whether a portion of shared use spectrum is free from known local users in a geographic area. Unlike the SAS for higher tier users, the local spectrum access database may be voluntary and may be incomplete or outdated. The system may also detect other GAA users that are not in the local spectrum access database. The disaggregated O-RAN architecture may provide access to in-phase and quadrature (IQ) samples received at a network entity such as a base station. Such IQ samples were not previously available to a network operator, or the network operator had little control over processing of such IQ samples. In an aspect, the system may identify signals that actually interfere with desired signals using machine-learning signal separation techniques applied to received IQ samples. For instance, a desired signal may experience multi-path propagation and arrive at a receiver as a superposition of multiple copies of the transmitted signal. Such multi-path propagation may appear to be interference but may not be considered an actually interfering signal from outside the system. An interfering signal from outside the system may be independent from the desired signal. The machine-learning signal separation techniques may output independent signals and/or a likelihood that a received signal includes multiple independent signals. Accordingly, the system may detect signals that are received at the same time as the desired signal and interfere with the desired signal. In some implementations, the system may be configured to mitigate interference from such external interfering signals. For example, the system may select a different portion of the shared spectrum to avoid the interfering signals. In some implementations, the system may add the interfering signal to the local spectrum access database to facilitate avoiding the interfering signals.

Figure 2:
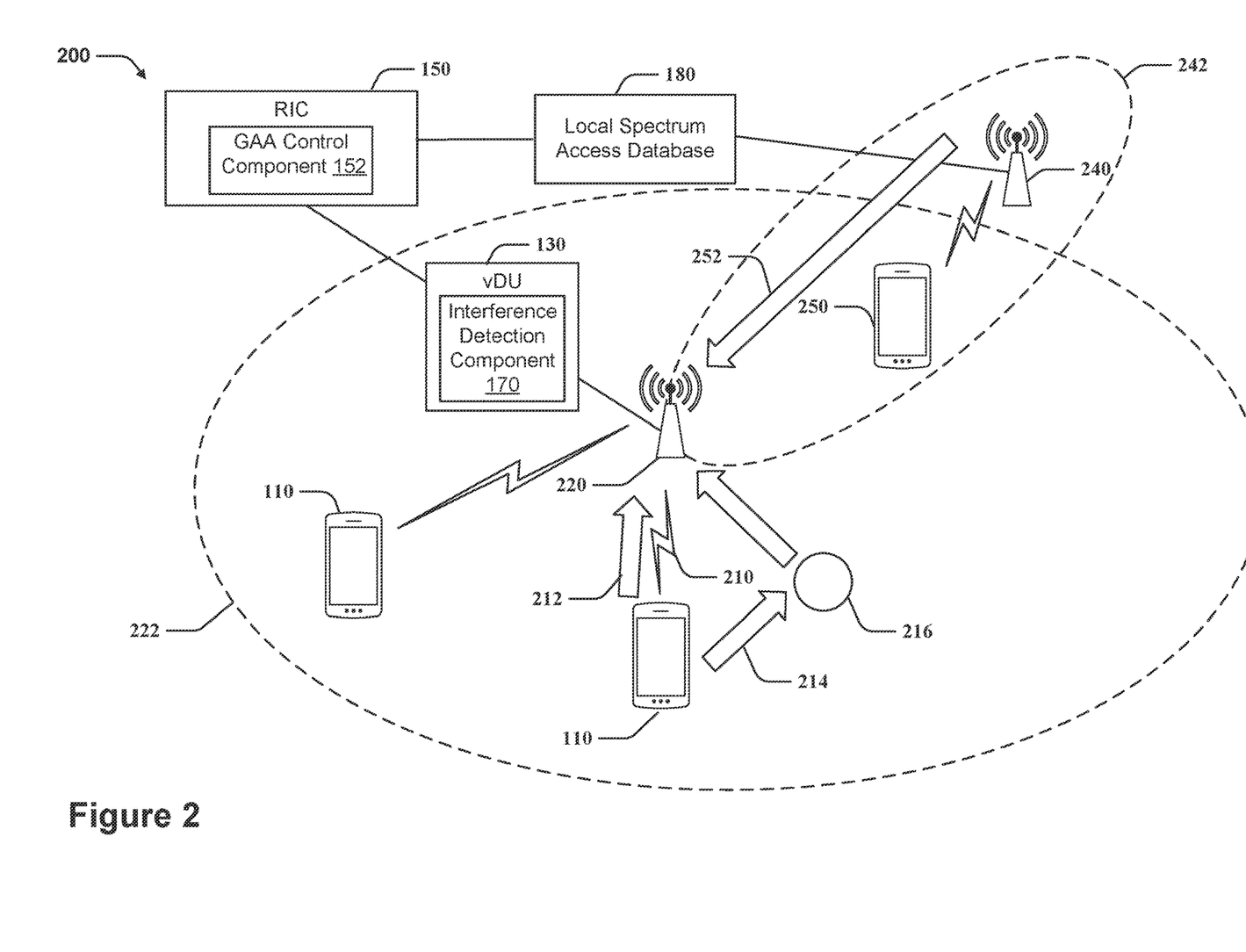
FIG. 2 is a diagram of an example deployment scenario where a first general authorized access (GAA) user experiences interference from a second GAA user.
Figure 3:
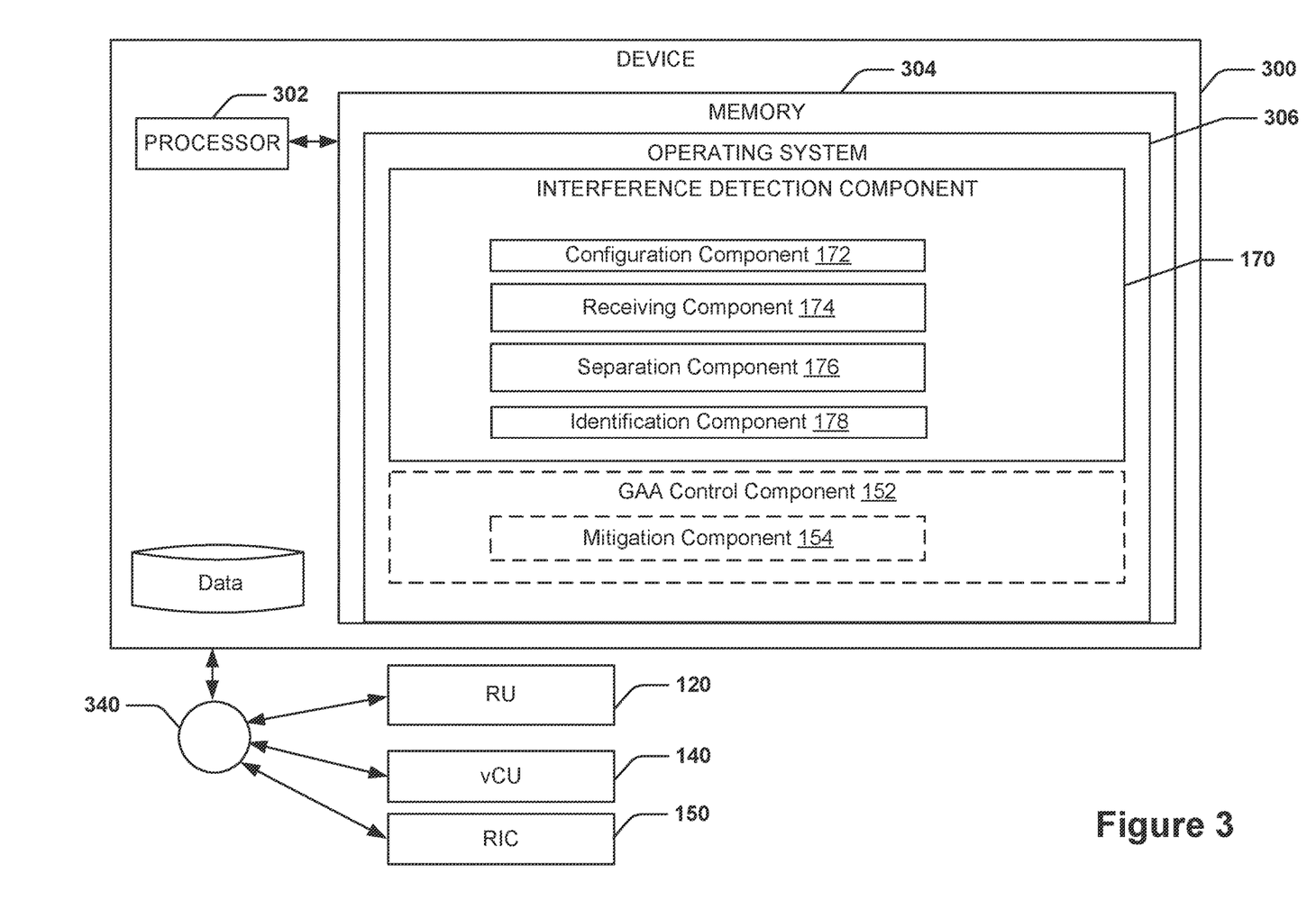
FIG. 3 is a schematic diagram of an example of an apparatus for implementing a virtual distributed unit including an interference detection component.
Figure 4:
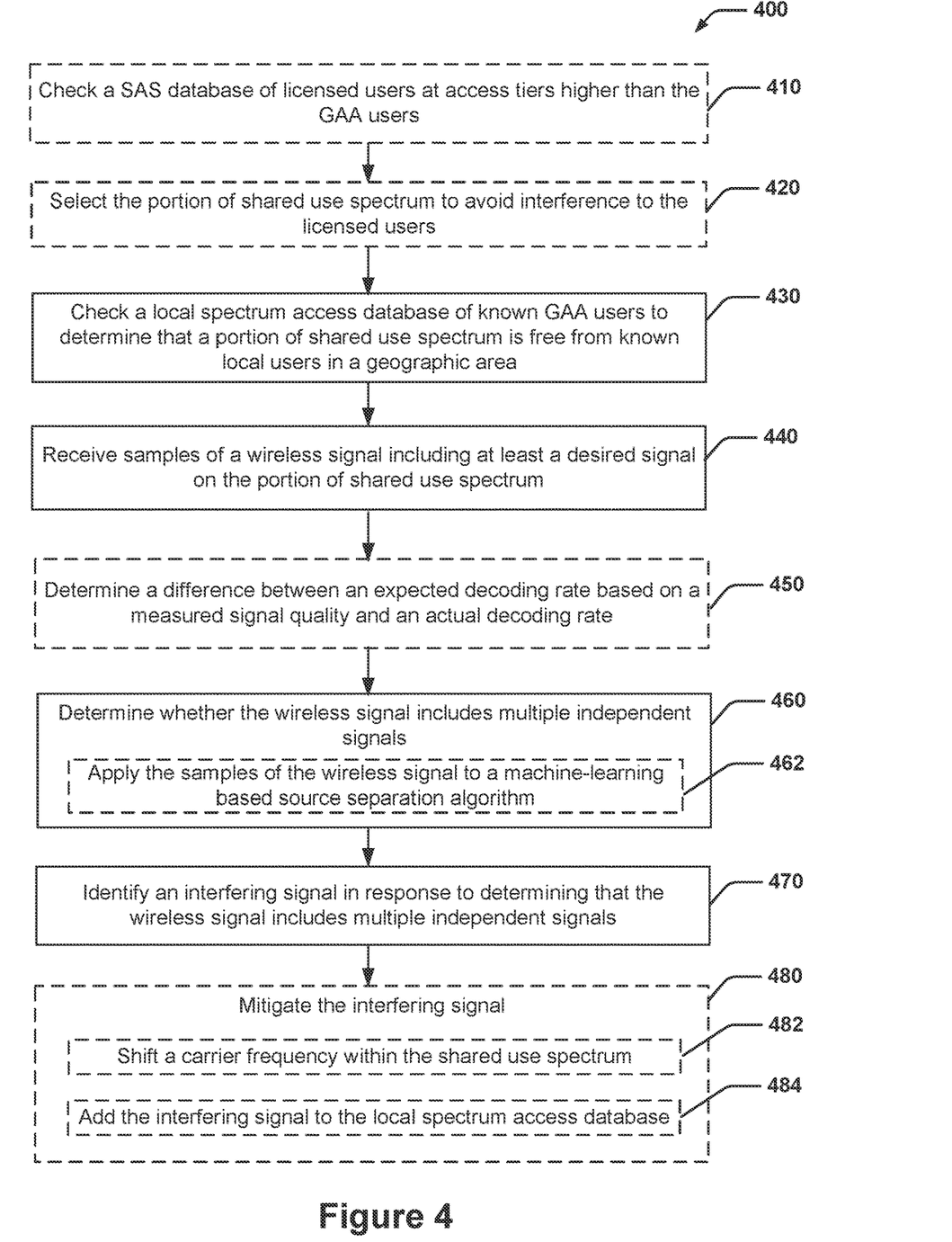
FIG. 4 is a flow diagram of an example of a method for interference detection by a GAA user.

Turning now to FIGS. 1-5, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

Figure 1:
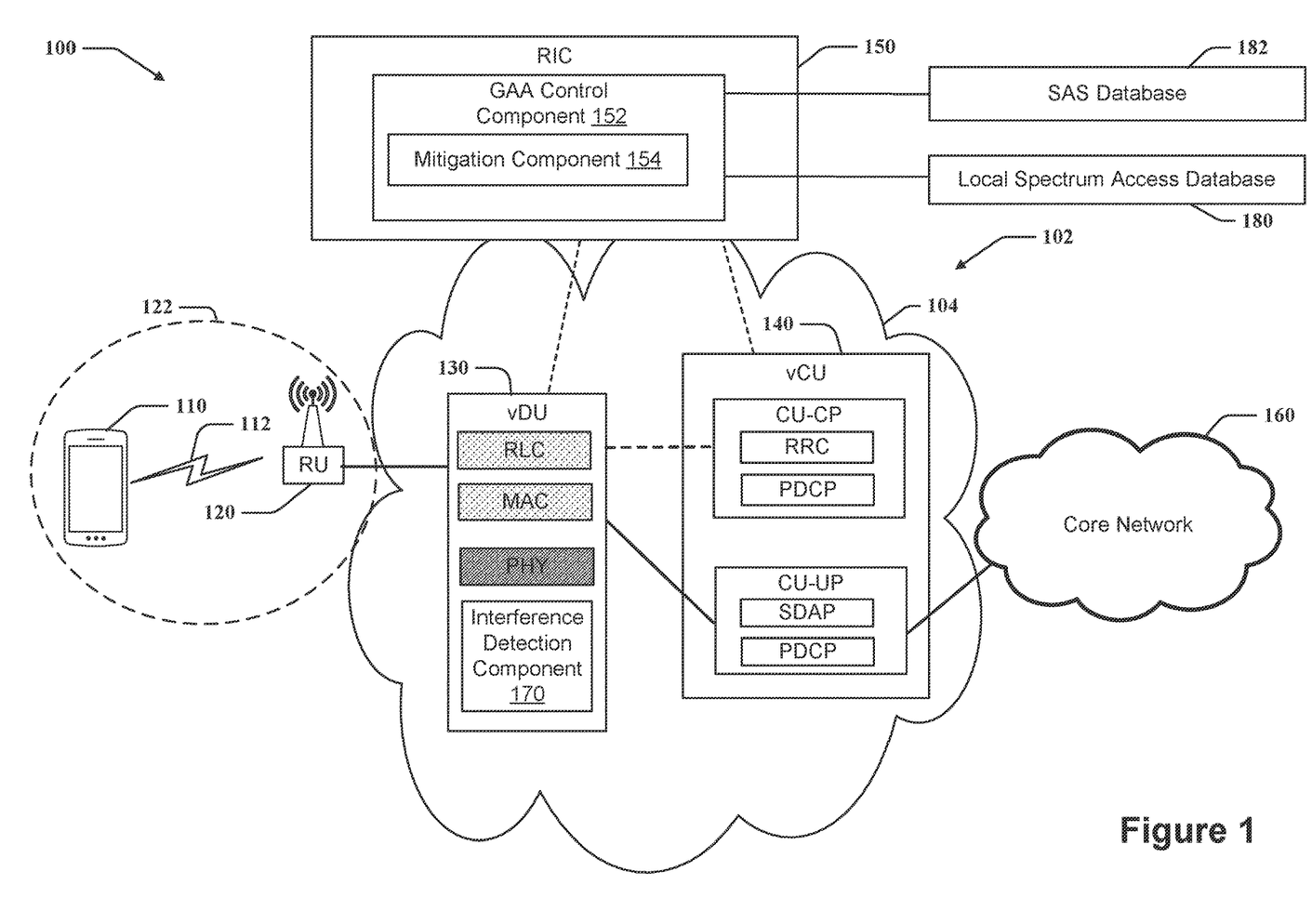
FIG. 1 is a diagram of an example mobile network including a radio access network (RAN) that connects a user equipment (UE) to a core network.

FIG. 1 is a diagram of an example mobile network 100 including a radio access network (RAN) that connects a user equipment (UE) 110 to a core network 160. The RAN may be implemented, at least in part, as a virtualized radio access network (vRAN) 102. The vRAN 102 may include radio units (RUs) 120 that transmit and receive wireless signals with the UEs 110 over a wireless link 112. Each RU 120 may provide a cell 122 having a coverage area that may overlap with other cells. Each RU 120 may include one or more antennas for transmitting and receiving radio frequency (RF) signals with the UEs 110 within the cell 122.

The vRAN 102 may include virtual network components, which may be implemented on generic computing resources such as in a cloud network 104. The cloud network 104 may include an underlying wide area network (WAN) having computing resources such as servers or datacenters that may be used to instantiate software network functions. For example, the vRAN 102 may include one or more virtual distributed units (vDUs) 130 that perform processing for a cell 122, for example, at the physical (PHY) layer, media access control (MAC) layer, and radio link control (RLC) layer. The vRAN 102 may include one or more virtual central units (vCUs) 140 that perform processing at higher layers of the wireless protocol stack. In an example architecture, the vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer.

The division of functionality or protocol layers between the vDU 130 and the vCU 140 may depend on a functional split architecture. For example, as illustrated, the functional split may be between the RLC layer and the PDCP layer and may be referred to as option 2. Other options may include a functional split between the RRC layer and PDCP layer (option1) or between or within the layers illustrated at the vDU 130. Accordingly, a vRAN 102 may allow network equipment vendors to offer network operators greater flexibility in where to locate computing resources for various protocol layers.

The vRAN 102 may include a RAN intelligent control (MC) 150 that performs autonomous configuration and optimization of the vRAN 102. In some implementations, the MC 150 may allocate resources of the cloud network 104 for instantiating vRAN components such as vDU 130 and vCU 140. For example, the MC 150 may provide a configuration file for each vDU 130 or vCU 140. The MC 150 may assign network resources such as frequency sub-bands to cells. Further, the MC may monitor performance of the vRAN 102 and adapt the configuration. For example, the MC 150 may receive monitoring information such as performance metrics from the vRAN components such as the vDU 130 and vCU 140.

In an aspect, the MC 150 may include a GAA control component 152 configured to control deployment of the vRAN 102 as a GAA user on a shared access band subject to tiered licensing. The GAA control component 152 may communicate with an interference detection component 170, which may be located at a vDU 130. For example, the interference detection component 170 may operate within or in parallel to PHY layer processing. For example, the interference detection component 170 may receive IQ samples from the RU 120 and detect interfering signals based on the IQ samples as described in further detail below. The GAA control component 152 may also communicate with a local spectrum access database 180 and a SAS database 182. The SAS database 182 may provide information about incumbent access users and/or PALs. The GAA control component 152 may avoid interfering with such higher tier users according to the GAA license.

The local spectrum access database 180 may store information about GAA users. In some implementations, the GAA control component 152 may host or control the local spectrum access database 180. Or the local spectrum access database 180 may be a publicly accessible database or a proprietary database provided by a third party, for example, based on a subscription. In some implementations, the GAA control component 152 includes a mitigation component 154 configured to mitigate interference caused by an interfering signal from another GAA user. Information about the other GAA user may be stored in the local spectrum access database 180.

Participation in the local spectrum access database 180 may be voluntary. For example, an enterprise acting as a GAA user may provide information about its system (e.g., vRAN 102) so that other GAA users may avoid interference. Similarly, the enterprise may want to obtain information about neighboring GAA users to avoid causing and receiving interference from the neighboring GAA users. Some GAA users, however, may not want to provide information regarding a network deployment to other GAA users. In some implementations, when interference from such GAA users is detected and becomes public knowledge, information about such GAA users may be added to the local spectrum access database 180.

FIG. 2 is a diagram 200 of an example deployment scenario where a first GAA user experiences interference from a second GAA user. The first GAA user may deploy a RU 220 that provides a cell 222 for wireless communication with UEs 110. The RU 220 may communicate with a vDU 130 that performs the PHY processing for the cell. The vDU 130 may be controlled by a RIC 150 of the first GAA user.

The second GAA user may deploy a RU 240 that provides a cell 242 for communication with a UE 250. In some implementations, there may be no coordination between the first GAA user and the second GAA user. The downlink signals from the RU 240 and/or the uplink signals from the UE 250 may interfere with reception at the RU 220. In a licensed spectrum, such interference can be avoided because only one party controls the spectrum and that party can coordinate RUs to avoid cross-link interference. In an unlicensed spectrum, users may follow CCA or LBT procedures to avoid interference. In a tiered access system, however, GAA users may cause interference to each other.

The interference detection component 170 at the vDU may detect signals that interfere with a desired signal. For example, a UE 110 may transmit a desired signal 210 toward the RU 220. The desired signal 210 may propagate along multiple paths such as a line-of-sight path 212 and a second path 214 that reflects off one or more objects 216. From the perspective of the RU 220, the desired signal 210 arriving via multiple paths may appear as interfering signals, but actually be time delayed versions of the same signal. An actual interfering signal 252 may be transmitted by the RU 240 or the UE 250. The interfering signal 252 may be independent of the desired signal 210.

In an aspect, the interference detection component 170 may determine whether a wireless signal received at the RU 220 includes multiple independent signals. For example, the interference detection component 170 may apply received IQ samples to a machine-learning (ML) source separation algorithm. The ML source separation algorithm may utilize a deep neural network (DNN) model. For example, a DNN for single channel source separation that may be used by the interference detection component 170 is described in Grais et al., "Deep Neural Networks for Single Channel Source Separation," arXiv:1311.2746v1, where samples of audio signals were applied to the model to separate vocal and instrumental sources. For separating sources of wireless signals in the IQ samples, the training data for the desired signal may be obtained by collecting samples from interference-free transmissions. The training data also includes transmissions with interference from controlled transmissions. The training data may be supplemented with simulated transmissions as well. Training may be performed in an offline fashion. However, the training dataset can be updated with instances where the bit error rate is statistically much higher than that is expected from the signal quality.

The ML source separation algorithm may output one or more independent signals. If the ML source separation algorithm outputs a single independent signal, the interference detection component 170 may determine that the received signal includes multiple copies of the desired signal 210 with different delays. If the ML source separation algorithm outputs multiple independent signals, the interference detection component 170 may determine that the received signal includes an interfering signal 252.

In some implementations, the interference detection component 170 may be triggered to detect an interfering signal 252 based on performance characteristics. For example, the interference detection component 170 may monitor a decoding rate or error rate (e.g., block error rate (BLER)) and determine a difference between an expected decoding rate based on a measured signal quality and an actual decoding rate. If the difference exceeds a threshold, the interference detection component 170 may determine whether the wireless signal includes multiple independent signals.

The interference detection component 170 may provide information about the interfering signal 252 to the GAA control component 152. For example, the interference detection component 170 may identify a time of the interfering signal 252 or a receive beam when the interfering signal 252 was detected.

In some implementations, the GAA control component 152 and/or the mitigation component 154 may attempt to mitigate the interfering signal 252. For example, the GAA control component 152 and/or the mitigation component 154 may shift a carrier frequency for the RU 220 within the shared use spectrum, or otherwise allocate different frequency resources to avoid the interfering signal 252. As another example, the GAA control component 152 and/or the mitigation component 154 may add the interfering signal to the local spectrum access database 180. Accordingly, the GAA control component 152 and other GAA systems may avoid the interfering signal 252.

FIG. 3 is a schematic diagram of an example of an apparatus 300 (e.g., a computing device) for implementing a vDU 130 including an interference detection component 170. The apparatus 300 may be an example of a network entity. The apparatus 300 may reside within a data center, which may be an edge data center. The apparatus 300 may be connected to other servers within the data center or at other data centers via the switch 340. For example, apparatus 300 may be connected to an RU 120, a vCU 140, and a RIC 150. In some implementations, one or more of the RU 120, vCU 140, or the RIC 150 may implement the interference detection component 170 or component thereof.

In an example, apparatus 300 can include a processor 302 and/or memory 304 configured to execute or store instructions or other parameters related to providing an operating system 306, which can execute one or more applications or processes, such as, but not limited to, the interference detection component 170. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, the interference detection component 170 may include one or more of a configuration component 172, a receiving component 174, a separation component 176, or an identification component 178.

The configuration component 172 may be configured to check the local spectrum access database 180 of known GAA users to determine that a portion of shared use spectrum is free from known local users in a geographic area. For example, the interference detection component 170 may provide geographic coordinates of the RU 120 to the GAA control component 152 to compare against the local spectrum access database 180. For instance, the GAA control component 152 may query the local spectrum access database 180 with the geographic coordinates for known GAA users within an interfering distance (e.g., 1 km for a macro cell), and compare the portion of shared use spectrum to the portions of spectrum used by the known GAA users. In some implementations, configuration component 172 and/or the GAA control component 152 may also check the SAS database 182 of licensed users at access tiers higher than the GAA users. In some implementations, the configuration component 172 and/or the GAA control component 152 may select the portion of shared use spectrum to avoid interference to the licensed users and/or the other GAA users.

The receiving component 174 may be configured to receive samples of a wireless signal including at least a desired signal on the portion of shared use spectrum. For example, the receiving component 174 may receive IQ samples from the RU 120. In some implementations, the receiving component 174 may include a network interface controller (NIC) configured to receive IP packets via the switch 340. The receiving component 174 may be configured to implement an O-RAN interface for receiving IQ samples within the IP packets. The samples may include at least the desired signal 210. For example, the samples may be collected when an uplink transmission from the UE 110 is scheduled. The samples may also include the interfering signal 252.

The separation component 176 may be configured to determine whether the wireless signal includes multiple independent signals. For example, the separation component 176 may be configured to apply the samples to the ML source separation algorithm. The separation component 176 may output the number of independent signals or the actual independent signals.

The identification component 178 may be configured to identify an interfering signal in response to determining that the wireless signal includes multiple independent signals. For example, the identification component 178 may identify the interfering signal 252 to the GAA control component 152 and/or the local spectrum access database 180. The identification component 178 may identify the interfering signal 252 by a frequency range over which the interfering signal 252 is detected or other signal properties.

In some implementations, the apparatus 300 may include the GAA control component 152. For example, the GAA control component 152 may be implemented at the vDU 130 or the vDU 130 and the RIC may be implemented on the same datacenter. The GAA component 152 may be configured to communicate with the local spectrum access database 180 and/or the SAS database 182. The GAA component 152 may include the mitigation component 154 configured to mitigate the interfering signal 252. For example, the GAA component 152 may shift a carrier frequency within the shared use spectrum or add the interfering signal 252 to the local spectrum access database 180.

FIG. 4 is a flow diagram of an example of a method 400 for interference detection by a GAA user. For example, the method 400 can be performed by an apparatus 300 and/or one or more components thereof to detect an interfering signal 252. Some blocks of the method 400 optionally may be performed by other network components in communication with the apparatus 300.

At block 410, the method 400 optionally includes checking a SAS database of licensed users at access tiers higher than the GAA users. In an example, the configuration component 172, e.g., in conjunction with processor 302, memory 304, and operating system 306, can check the SAS database 182 of licensed users at access tiers higher than the GAA users. For instance, the configuration component 172 may access the SAS database 182 directly or via the GAA control component 152.

At block 420, the method 400 optionally includes selecting the portion of shared use spectrum to avoid interference to the licensed users. In an example, the configuration component 172, e.g., in conjunction with processor 302, memory 304, and operating system 306, can select the portion of shared use spectrum to avoid interference to the licensed users. For example, the configuration component 172 may receive an indication of the portion of shared use spectrum from the GAA control component 152 or autonomously select the portion of shared use spectrum that is not being used by the licensed users.

At block 430, the method 400 includes checking a local spectrum access database of known GAA users to determine that a portion of shared use spectrum is free from known local users in a geographic area. In an example, the configuration component 172, e.g., in conjunction with processor 302, memory 304, and operating system 306, can check the local spectrum access database 180 of known GAA users to determine that the portion of shared use spectrum is free from known local users in a geographic area. For instance, the configuration component 172 may access the local spectrum access database 180 directly or via the GAA control component 152.

At block 440, the method 400 includes receiving samples of a wireless signal including at least a desired signal on the portion of shared use spectrum. In an example, the receiving component 174, e.g., in conjunction with processor 302, memory 304, and operating system 306, can receive samples of a wireless signal including at least a desired signal on the portion of shared use spectrum. For instance, the receiving component 174 may receive the samples from the RU 120.

At block 450, the method 400 may optionally include determining a difference between an expected decoding rate based on a measured signal quality and an actual decoding rate. In an example, the receiving component 174, e.g., in conjunction with processor 302, memory 304, and operating system 306, can determine a difference between an expected decoding rate based on a measured signal quality and an actual decoding rate.

At block 460, the method 400 includes determining whether the wireless signal includes multiple independent signals. In an example, the separation component 176, e.g., in conjunction with processor 302, memory 304, and operating system 306, can determine whether the wireless signal includes multiple independent signals. In some implementations, at sub-block 462, the block 460 may include applying the samples of the wireless signal to a machine-learning based source separation algorithm. The output of the machine-learning based source separation algorithm may indicate multiple copies of the desired signal with different delays, which are not considered multiple independent signals. Alternatively, the output of the machine-learning based source separation algorithm may indicate at least one signal independent of the desired signal.

At block 470, the method 400 includes identifying an interfering signal in response to determining that the wireless signal includes multiple independent signals. In an example, the identification component 178, e.g., in conjunction with processor 302, memory 304, and operating system 306, can identify an interfering signal 252 in response to determining that the wireless signal includes multiple independent signals.

At block 480, the method 400 may optionally include mitigating the interfering signal. In an example, the mitigation component 154, e.g., in conjunction with processor 302, memory 304, and operating system 306, can mitigate the interfering signal. For instance, in some implementations, at sub-block 482, the block 480 may include shifting a carrier frequency within the shared use spectrum. As another example, in some implementations, at sub-block 484, the block 480 may include adding the interfering signal 252 to the local spectrum access database 180.

Figure 5:
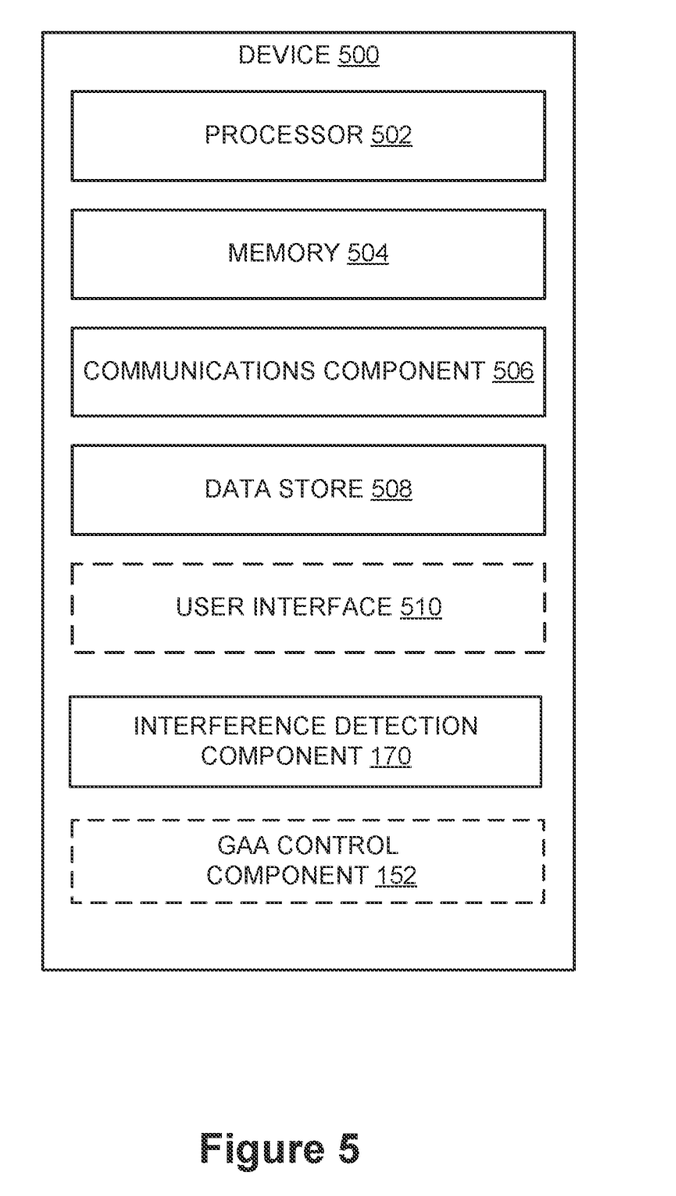
FIG. 5 illustrates an example of a device 500 including additional optional component details as those shown in FIG. 3.

FIG. 5 illustrates an example of a device 500 including additional optional component details as those shown in FIG. 3. In one aspect, device 500 may include processor 502, which may be similar to processor 302 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 304 such as for storing local versions of operating systems (or components thereof) and/or applications being executed by processor 502, such as the interference detection component 170, the GAA control component 154, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc. not currently being executed by processor 502. In addition, data store 508 may be a data repository for interference detection component 170, GAA control component 152, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include the interference detection component 170 for detecting the interfering signal 252 and/or the GAA control component 152 for avoiding interference, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for wireless communications, comprising:
    a memory storing computer executable instructions; and
    a processor coupled with the memory and configured to execute the instructions to:
        check a local spectrum access database of known general authorized access (GAA) users to determine that a portion of shared use spectrum is free from known local users in a geographic area;
        receive samples of a wireless signal including at least a desired signal on the portion of shared use spectrum;
        determine a difference between an expected decoding rate based on a measured signal quality and an actual decoding rate;
        determine whether the wireless signal includes multiple independent signals, wherein determining whether the wireless signal includes multiple independent signals in response to the difference exceeding a threshold; and
        identify an interfering signal in response to determining that the wireless signal includes multiple independent signals.

2. The apparatus of claim 1, wherein the processor is further configured to mitigate the interfering signal.

3. The apparatus of claim 2, wherein to mitigate the interfering signal, the processor is further configured to shift a carrier frequency within the shared use spectrum.

4. The apparatus of claim 2, wherein to mitigate the interfering signal, the processor is further configured to add the interfering signal to the local spectrum access database.

5. The apparatus of claim 1, wherein the processor is configured to:
    check a spectrum access system SAS database of licensed users at access tiers higher than the GAA users; and
    select the portion of shared use spectrum to avoid interference to the licensed users.

6. The apparatus of claim 1, wherein to determine whether the wireless signal includes multiple independent signals, the processor is configured to apply the samples of the wireless signal to a machine-learning based source separation algorithm.

7. The apparatus of claim 6, wherein to determine whether the wireless signal includes multiple independent signals, the machine-learning based source separation algorithm is configured to indicate multiple copies of the desired signal with different delays.

8. The apparatus of claim 6, wherein to determine whether the wireless signal includes multiple independent signals, the machine-learning based source separation algorithm is configured to indicate at least one signal independent of the desired signal.

9. A method comprising:
    checking a local spectrum access database of known general authorized access (GAA) users to determine that a portion of shared use spectrum is free from known local users in a geographic area;
    receiving samples of a wireless signal including at least a desired signal on the portion of shared use spectrum;
    determining a difference between an expected decoding rate based on a measured signal quality and an actual decoding rate;
    determining whether the wireless signal includes multiple independent signals, wherein determining whether the wireless signal includes multiple independent signals is in response to the difference exceeding a threshold; and
    identifying an interfering signal in response to determining that the wireless signal includes multiple independent signals.

10. The method of claim 9, further comprising mitigating the interfering signal.

11. The method of claim 10, wherein mitigating the interfering signal comprises shifting a carrier frequency within the shared use spectrum.

12. The method of claim 10, wherein mitigating the interfering signal comprises adding the interfering signal to the local spectrum access database.

13. The method of claim 9, further comprising:
    checking a spectrum access system (SAS) database of licensed users at access tiers higher than the GAA users; and
    selecting the portion of shared use spectrum to avoid interference to the licensed users.

14. The method of claim 9, wherein determining whether the wireless signal includes multiple independent signals further comprises apply the samples of the wireless signal to a machine-learning based source separation algorithm.

15. The method of claim 14, wherein determining whether the wireless signal includes multiple independent signals comprises an output of the machine-learning based source separation algorithm indicating multiple copies of the desired signal with different delays.

16. The method of claim 14, wherein determining whether the wireless signal includes multiple independent signals further comprises the machine-learning based source separation algorithm is indicating at least one signal independent of the desired signal.

17. A non-transitory computer-readable medium storing computer-executable instructions that when executed by a processor cause the processor to:

check a local spectrum access database of known general authorized access (GAA) users to determine that a portion of shared use spectrum is free from known local users in a geographic area;

receive samples of a wireless signal including at least a desired signal on the portion of shared use spectrum;

determine a difference between an expected decoding rate based on a measured signal quality and an actual decoding rate;

determine whether the wireless signal includes multiple independent signals, wherein determining whether the wireless signal includes multiple independent signals in response to the difference exceeding a threshold; and identify an interfering signal in response to determining that the wireless signal includes multiple independent signals.

18. The non-transitory computer-readable medium of claim 17, further comprising instructions to mitigate the interfering signal.

19. The non-transitory computer-readable medium of claim 17, wherein the computer-executable instructions to determine whether the wireless signal includes multiple independent signals comprise computer-executable instructions to apply the samples of the wireless signal to a machine-learning based source separation algorithm.

20. The non-transitory computer-readable medium of claim 19, wherein the computer-executable instructions to determine whether the wireless signal includes multiple independent signals comprise computer-executable instructions for the machine-learning based source separation algorithm to indicate at least one signal independent of the desired signal.

* * * * *